United States Patent [19]

Wright

[11] Patent Number: 4,498,746
[45] Date of Patent: Feb. 12, 1985

[54] EXTENSION PLATFORM TO SUPPORT TRANSPARENCIES FOR AN OVERHEAD PROJECTOR

[76] Inventor: John S. Wright, 6115 N. Lake Dr. Ct., Milwaukee, Wis. 53217

[21] Appl. No.: 540,029

[22] Filed: Oct. 7, 1983

Related U.S. Application Data

[63] Continuation-in-part of Ser. No. 74,490, Sep. 11, 1979, abandoned.

[51] Int. Cl.³ .............................................. G03B 21/00
[52] U.S. Cl. ............................... 353/120; 353/DIG. 5
[58] Field of Search ................. 353/103, DIG. 5, 120, 353/98, 99

[56] References Cited

U.S. PATENT DOCUMENTS 3,642,359  2/1972  Kitch .................................... 353/23
3,709,590  1/1973  Bisberg ................................ 353/120

Primary Examiner—Harry N. Haroian
Attorney, Agent, or Firm—Quarles & Brady

[57] ABSTRACT

An extension platform for holding a book of transparencies in an operative position on an overhead projector includes a body member adapted to receive and hold a pack of transparencies, at least two suction cups positioned on the underside of the body member for attaching and securing the body member to the stage area of an overhead projector and wedge-shaped fulcrum means located under the body member which translates the downward gravitational force of the weight of the pack of transparencies into an upward pull on the suction cups. In another embodiment, the extension platform is attached to part of a book of transparencies.

9 Claims, 13 Drawing Figures

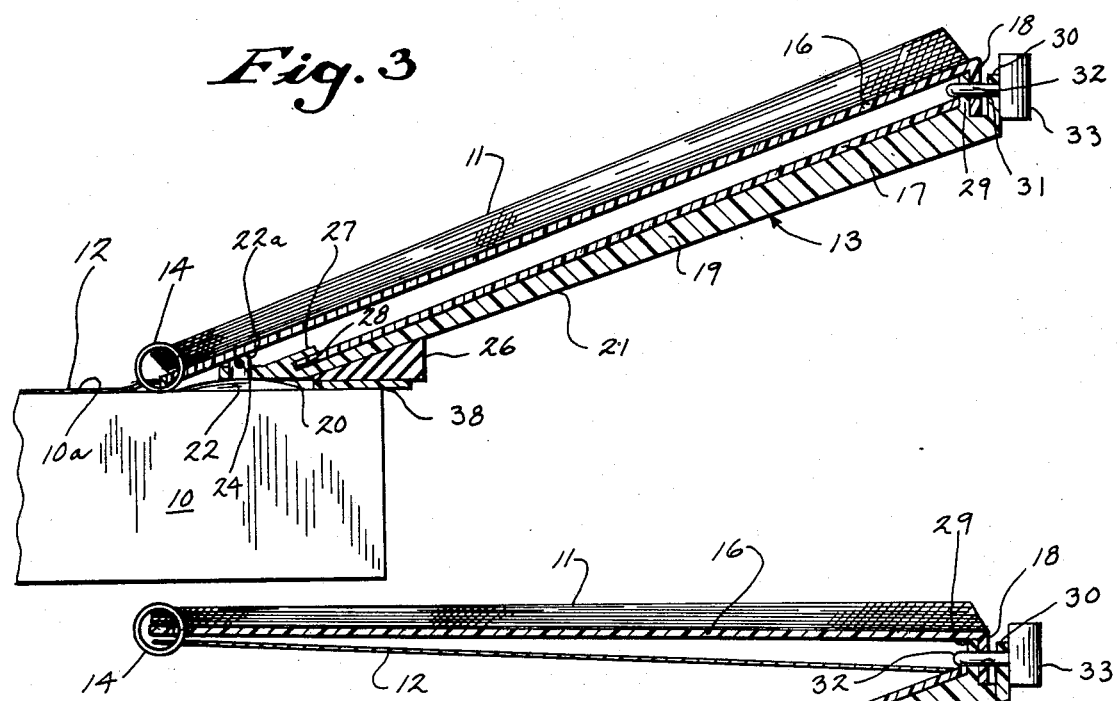
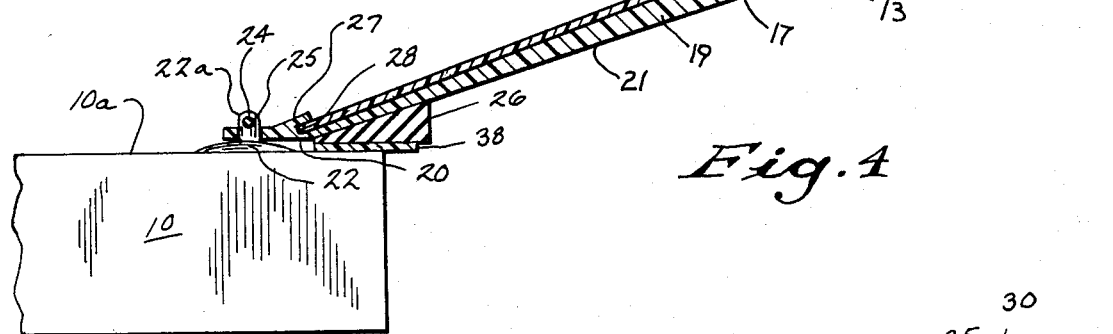
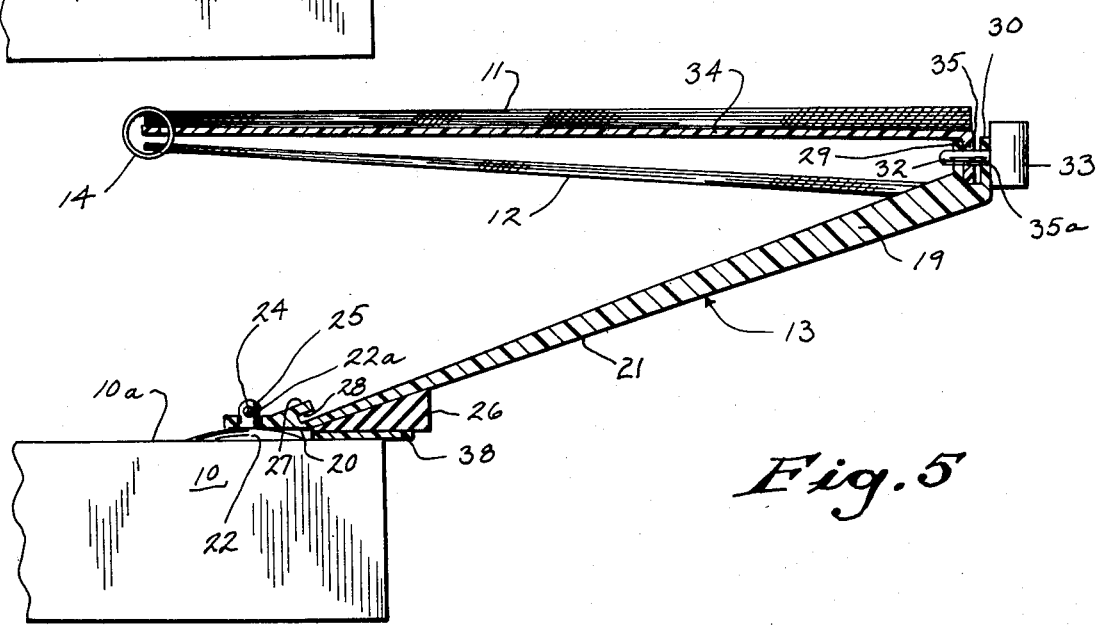

EXTENSION PLATFORM TO SUPPORT TRANSPARENCIES FOR AN OVERHEAD PROJECTOR

RELATED APPLICATION

The present application is a continuation-in-part of my earlier application Ser. No. 74,490 filed Sept. 11, 1979 now abandoned.

FIELD OF THE INVENTION

The present invention generally relates to an extension platform. More particularly, it relates to an extension platform for supporting a pack of transparencies in an operative position on an overhead projector.

BACKGROUND OF THE INVENTION

The present invention is an improvement on the devices described in my earlier patents, U.S. Pat. Nos. 3,253,358 titled "Visual Teaching System" issued May 31, 1966 and 3,524,703 titled "Transparency Storage and Display Device for an Overhead Projector" issued Aug. 18, 1970. The devices disclosed in those patents employed auxiliary stages which were laid upon the stage of the projector and used to hold a pack of transparencies in an overhanging operative position. The auxiliary stages were retained in position overlying the primary stage of the projector by use of either counterweights of adhesive tape to compensate for the weight of the overhanging pack of transparencies.

In the use of either of the patented devices the transparencies can be readily and easily moved successively from the pack to the auxiliary stage for projection by the projector and after projection moved back to storage in the pack.

SUMMARY OF THE INVENTION

The present invention relates to a novel extension platform which is particularly useful for supporting a pack of transparencies in an operative position on an overhead projector. The extension platform includes a body member adapted to receive and hold a pack of transparencies, at least two suction cups positioned on the underside of the body member for attaching and securing the body member to the stage area of an overhead projector, fulcrum means located beneath the body member to translate the downward gravitational force of the weight of the pack of transparencies into an upward pull on the suction cups and hinge means which can be used to attach the pack of transparencies to the platform in such a manner that the pack of tranparencies can be raised and lowered to rotate the transparencies from the pack into position for projection and back into the pack for storage.

There are two embodiments of the invention disclosed. In one embodiment there is a separate extension platform which is designed to be used to support any one of a number of packs of transparencies individually in an operative position on an overhead projector. In the other embodiment the extension platform is attached to the cover of a book containing a pack of transparencies; thus, making the use of a separate extension platform unnecessary.

It is the primary object of the present invention to disclose a simple and convenient extension platform which is particularly useful for supporting a pack of transparencies in operative position on a projector.

Other objects and advantages will be apparent from the description and the drawings which follow:

DESCRIPTION OF THE DRAWINGS

FIG. 3 is a side view, in section, showing the extension platform of FIG. 2 on an overhead projector with a book containing a pack of tranparencies in place and a transparency in position for projection;

FIG. 4 is a side view, in section, of the apparatus shown in FIG. 3 with the main portion of the pack of transparencies raised and a transparency moved into storage position;

FIG. 5 is a side view similar to FIG. 4 showing the extension platform and pack of transparencies that is not in a book with protective covers;

DESCRIPTION OF THE PREFERRED EMBODIMENTS

Figure 1:
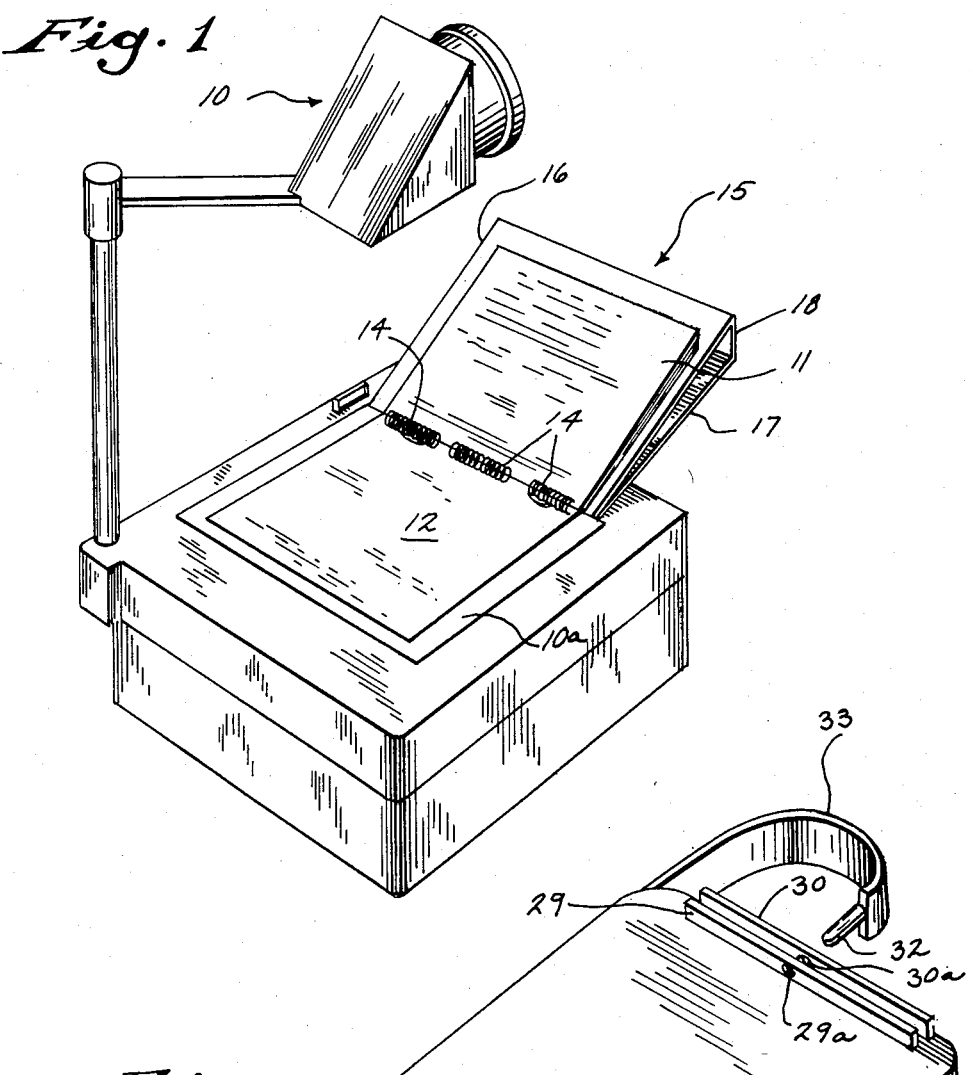
FIG. 1 is a perspective view of an overhead projector with a book containing a pack of tranparencies supported thereon in operative position by an extension platform of the present invention.

Referring to FIG. 1 an overhead projector 10 can be seen with a pack 11 of transparencies 12 positioned in operative position. The pack 11 of transparencies 12 is supported by an extension platform which cannot be seen in FIG. 1. The extension platform which is identified by the numerals 13 and 13' in the other figures of the drawings may be a separate unit such as that seen in FIGS. 2 to 5 and 13 or an integral part of a book of transparencies such as seen in FIGS. 6 to 12.

Returning to FIG. 1, it can be seen that the pack 11 of transparencies 12 has a coiled wire or ring binding 14. Such a binding is preferred because it permits an individual transparency 12 to be moved to a full lay-flat position on the stage 10a of the projector thus avoiding any distortion in the projected image. As seen in FIG. 1 the pack 11 is contained in a book 15 having a pair of protective covers 16 and 17 joined by a hinge 18.

The preferred embodiment of the separate extension platform 13 is shown in FIGS. 2 to 5. As seen therein the platform 13 comprises a body member 19 having a relatively small base 20 at one end and a relatively large upwardly inclined section 21 at the other end. Depending from the base 20 are three suction cups 22 which are used to secure the extension platform 13 to the stage 10a of the overhead projector 10. The suction cups 22 are preferably of vinyl or silicone elastomer, and they have necks 22a which extend through openings 23 in the base 20. The suction cups 22 are retained in the openings 23 by a relatively rigid bar 24 which extends through aligned openings 25 in the necks 22a of the suction cups 22.

The top surface of the inclined section 21 is adapted to receive and hold the pack 11 of transparencies 12. Located on the underside of inclined section 21 of the body member 19 adjacent the point at which the inclined section 21 meets the base 20 is a generally wedge-shaped fulcrum 26.

The fulcrum 26, which may be molded of the same material as the main body member 19, supports the inclined section 21 at an angle of approximately 20° above the horizontal plane of the stage 10a of the projector 10. The fulcrum 26 serves to translate the downward force exerted by the weight of the pack 11 on the inclined section 21 into a substantially upward pull on the suction cups 22. It has been discovered that the suction cups 22 hold most securely when the force which is exerted on them is a substantially vertical upward pull. Therefore, the preferred shape and position of the fulcrum 26 and the preferred angle at which the inclined section 21 is maintained by the fulcrum 26 should be selected so that the pull on the suction cups 22 is as vertically directed as possible.

Figure 2:
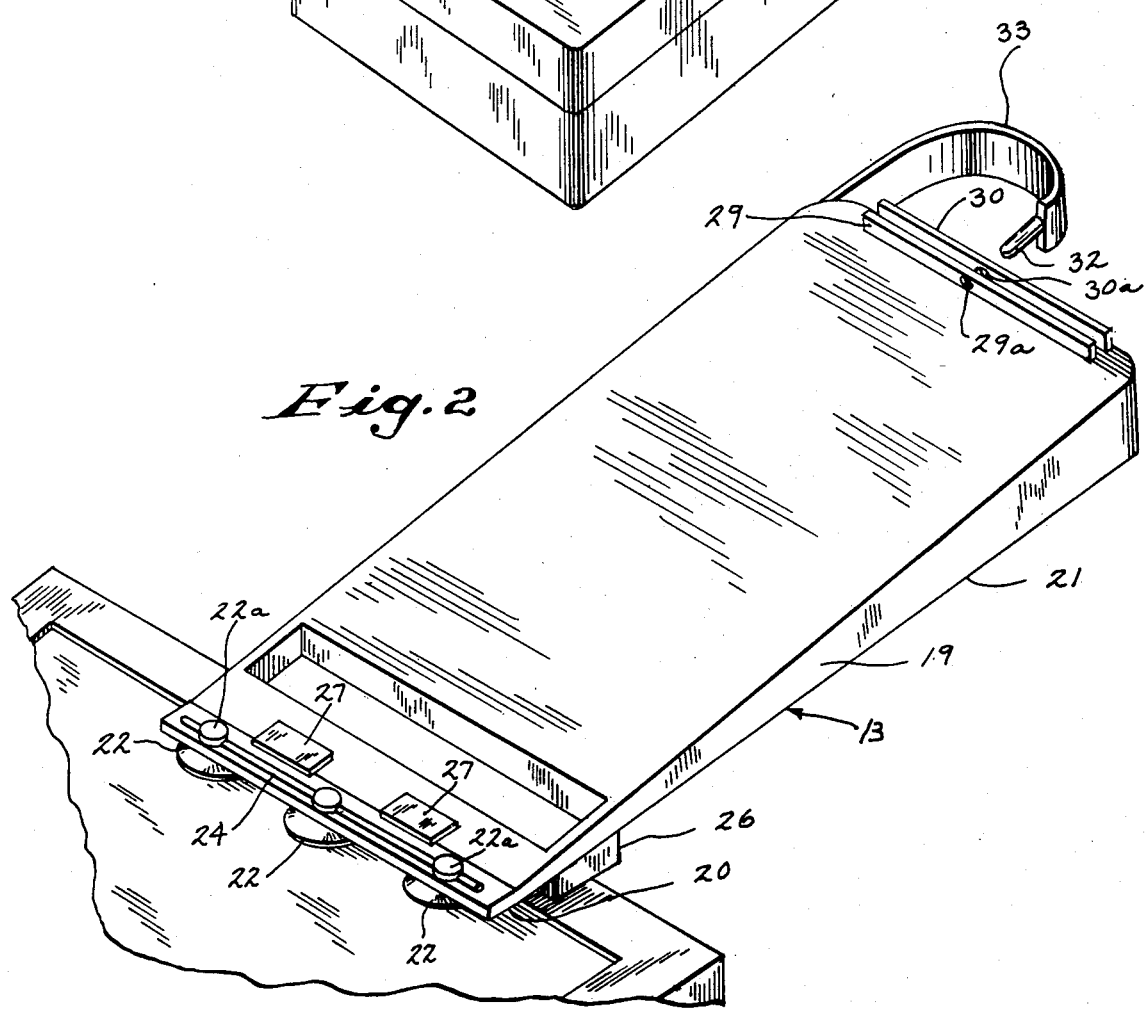
FIG. 2 is an enlarged perspective view of an embodiment of the invention which is an extension platform which can be used to support a pack of transparencies in the manner shown in FIG. 1.

Referring now to FIGS. 2, 3, and 4, it can be seen that the upper surface or top of the inclined section 21 of the extension platform 13 is provided with fingers 27 which rise above and extend substantially parallel to the top of the inclined section 21. The spaces 28 formed between the underside of the fingers 27 and the top of the inclined section 21 are adapted to receive and retain the outer edge of bottom cover 17 of the book of transparencies. The fingers 27 are preferably molded integrally with the body member 19 of the extension platform 13 and are of the same material. The fingers 27 prevent the lower or bottom cover 17 of the book 15 from being raised as might occur in the process of moving transparencies from the book 15 to the stage 10a and from the stage 10a into the book 15.

In FIGS. 2, 3, and 4 there also can be seen a pair of spaced apart upward projections 29 and 30 at the other end of the inclined section 21. As seen in FIGS. 3 and 4, the projections 29 and 30 cooperate with a projection receiving slot 31 in the hinge 18 of the book 15 to prevent the book 15 from sliding down the inclined survace and onto the stage 10a. The upward projections 29 and 30 have openings 29a and 30a which are aligned with an opening 18a in the hinge 18. As seen best in FIG. 2, a plug 32 is connected to the body member 19 by a strand of plastic material 33. The strand 33 prevents the plug 32 from becoming lost or misplaced.

When the book 15 is in place on the extension platform 13 with the outer edge of the lower cover 17 in the spaces 28 and the plug 32 in place in the aligned openings 29a, 30a and 18a of the projections 29 and 30 and the hinge 18, the book 15 cannot be accidentally dislodged from the extension platform 13 as could happen when the pack 11 is being raised and lowered in the process of moving the transparencies 12 onto the stage 10a of the projector 10 and back into the pack 11 for storage.

In FIG. 5 a pack 11 of tranparencies 12 is shown which is not in a book having protective covers. The pack 11 of transparencies 12 shown therein has a single stiffening page 34 which is attached at one end to the pack 11 of transparencies 12 by a binding 14. The other end of the page 34 has a downwardly folded portion 35 which serves as a hinge. The portion 35 has an opening 35a extending therethrough which can be aligned with the openings 29a and 30a in the projections 29 and 30. When the plug 32 is inserted therethrough the pack 11 of transparencies 12 is retained on the inclined section 20 of extension platform 13.

A second embodiment of the invention is shown in FIGS. 6 to 12; as seen therein the extension platform 13' is an integral part of a book or binder 15' containing a pack 11' of transparencies 12'. The binder 15' has a relatively rigid top cover 16' and a relatively rigid bottom cover 17' connected by a hinge 18'. The pack 11' of transparencies 12' is connected to the free end of the top cover 16' by a ring binding 14' in the manner previously described.

In the second embodiment, the top cover or panel 16' functions as in the first embodiment to support and protect the transparencies 12' during handling or storage, but the bottom cover 17', in addition, also serves as the body member 19' of the extension platform 13'. The bottom cover 17' as seen in FIGS. 6 and 7 includes a generally horizontal base 20' and an inclined section or bottom panel 21'.

Figure 8:
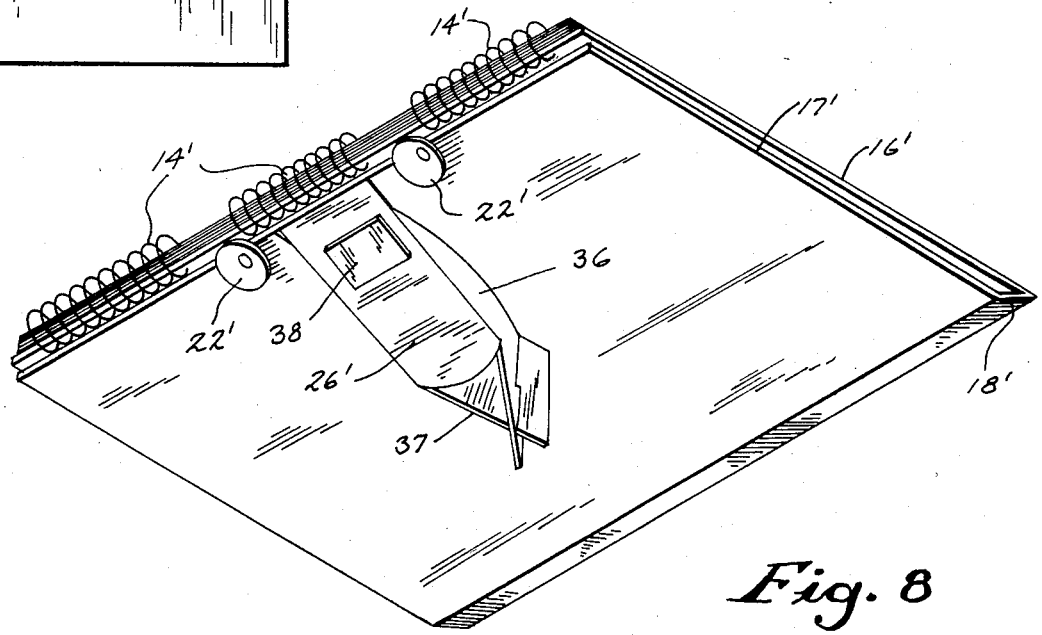
FIG. 8 is a perspective view of the embodiment of FIGS. 6 and 7 showing the lower cover of the book with the fulcrum assembled.
Figure 9:
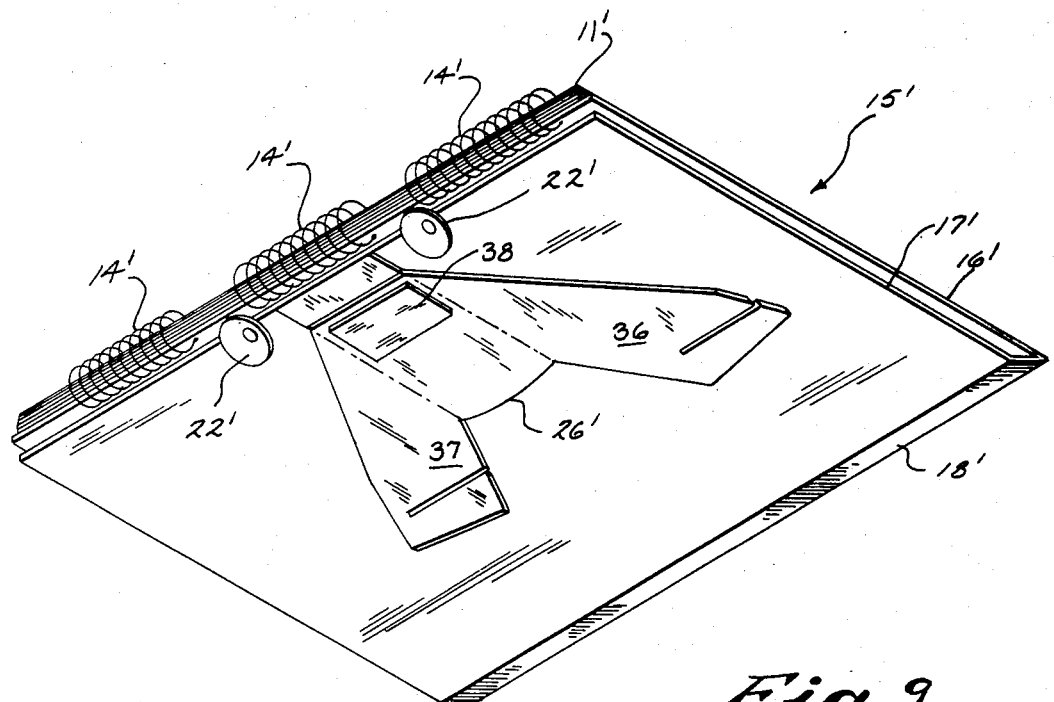
FIG. 9 is a perspective view like FIG. 8 showing the fulcrum unassembled.

Referring now to FIGS. 8 and 9, it can be seen that depending from the base 20' on the free end of the cover 17' are a pair of suction cups 22' for securing the binder 15' and the pack 11' of transparencies 12' to the stage 10a of the overhead projector 10. The suction cups 22' can be affixed to the base 20' of the cover 17' in a manner similar to that previously described in connection with the first embodiment.

Figure 6:
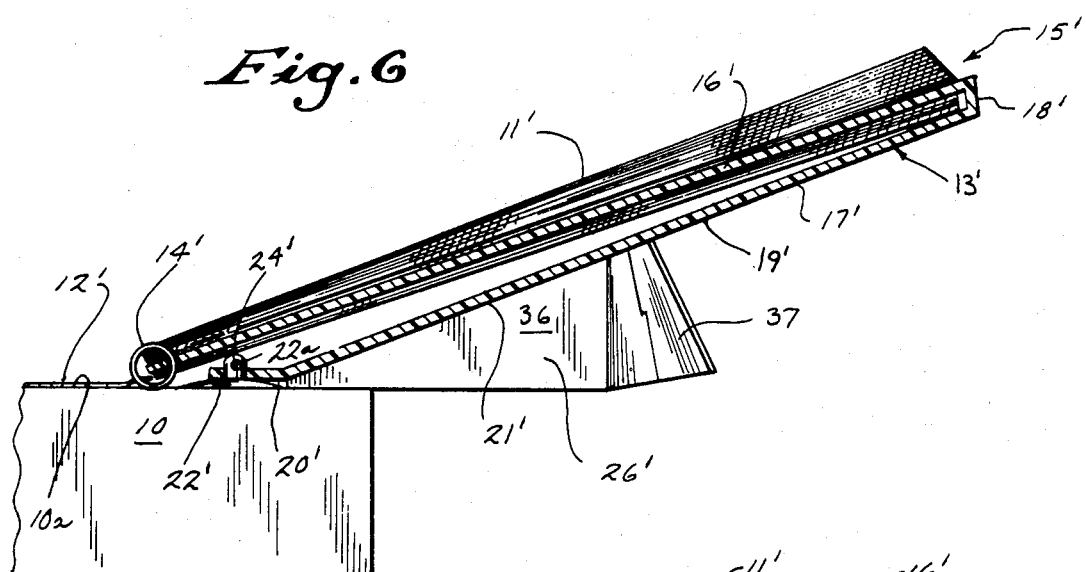
FIG. 6 is a side view, in section, of an embodiment of the invention in which the extension platform is an integral part of the lower cover of a book containing a pack of tranparencies.
Figure 7:
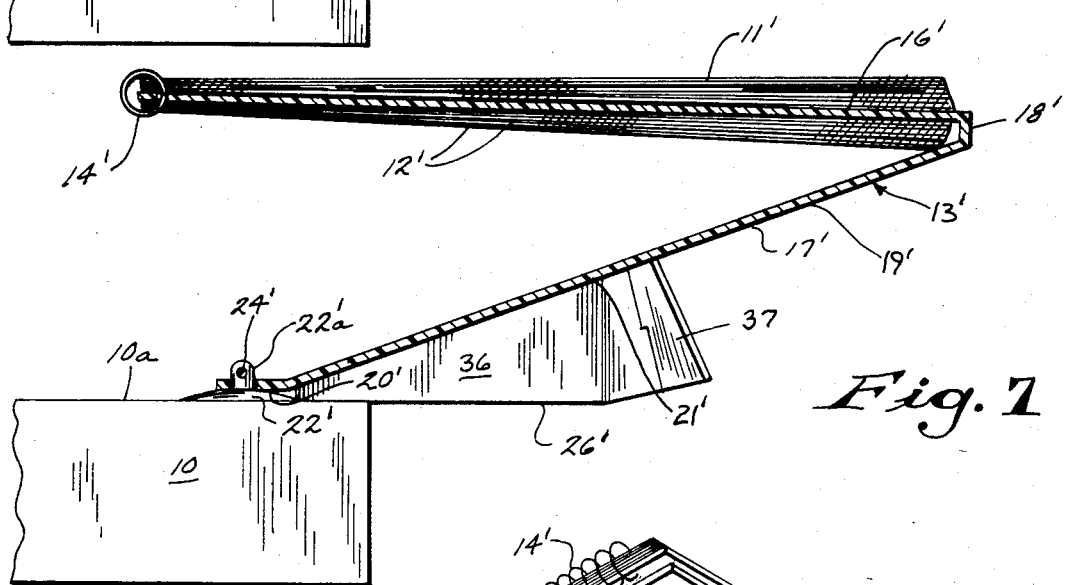
FIG. 7 is a view of the apparatus of FIG. 6 with the pack raised and a transparency moved into a storage position.

Turning now to FIGS. 6 and 7, it can be seen that the binder 15' is supported in the preferred inclined position by a fulcrum 26'. The fulcrum 26' translates the gravitational force exerted by the weight of the binder 15' into an upward pull on the suction cups 22'.

Figure 10:
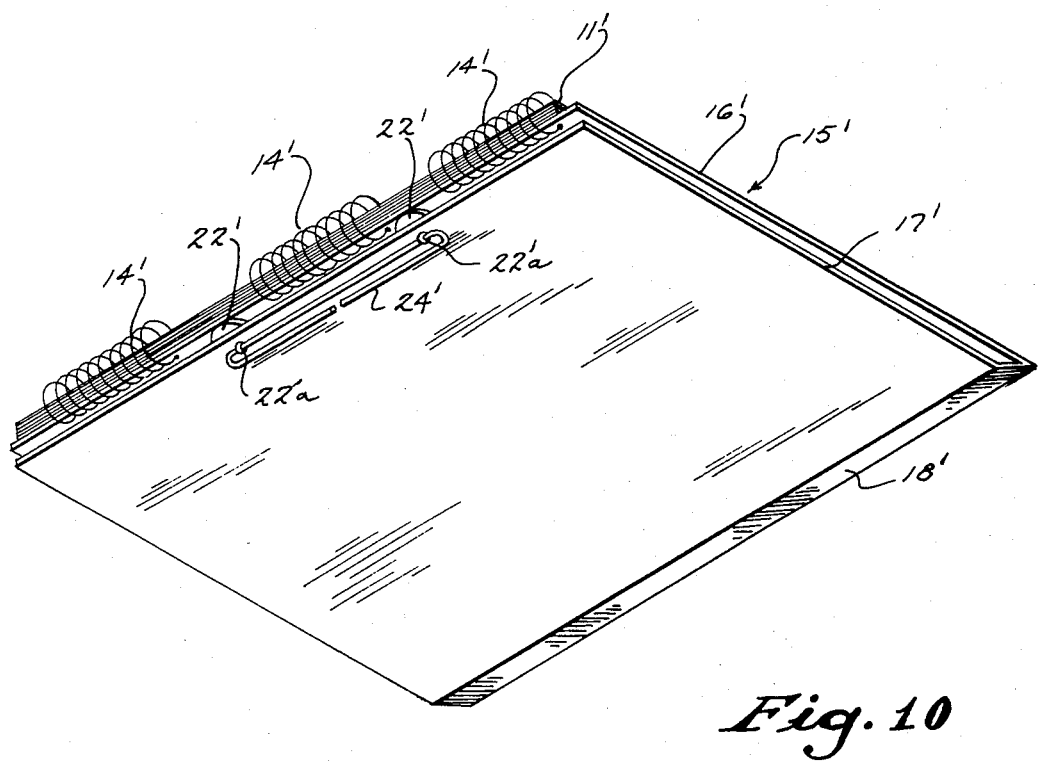
FIG. 10 is a perspective view of the book of tranparencies shown in FIG. 6 to 9 with the covers in position to protect the pack of transparencies.

Returning to FIG. 8 it is seen that the fulcrum 26' is formed of interlocked flaps 36 and 37. The flaps 36 and 37 when not interlocked lay flat as seen in FIG. 9 so that the covers 16' and 17' can be moved into position as seen in FIG. 10 to protect the pack 11 of transparencies for storage.

For purposes of aligning the binder 15' properly on the stage 10a as shown in FIGS. 6 and 7 so that the transparency 12' to be projected will be properly aligned on stage 10a, the cover 17' may be provided with alignment markings (not shown).

In the second embodiment described, the extension platform 13' is attached to the binder 15'; therefore, there is no need for means to prevent the binder from sliding onto the stage 10a of the overhead projector or to retain the lower cover 17'.

Figure 11:
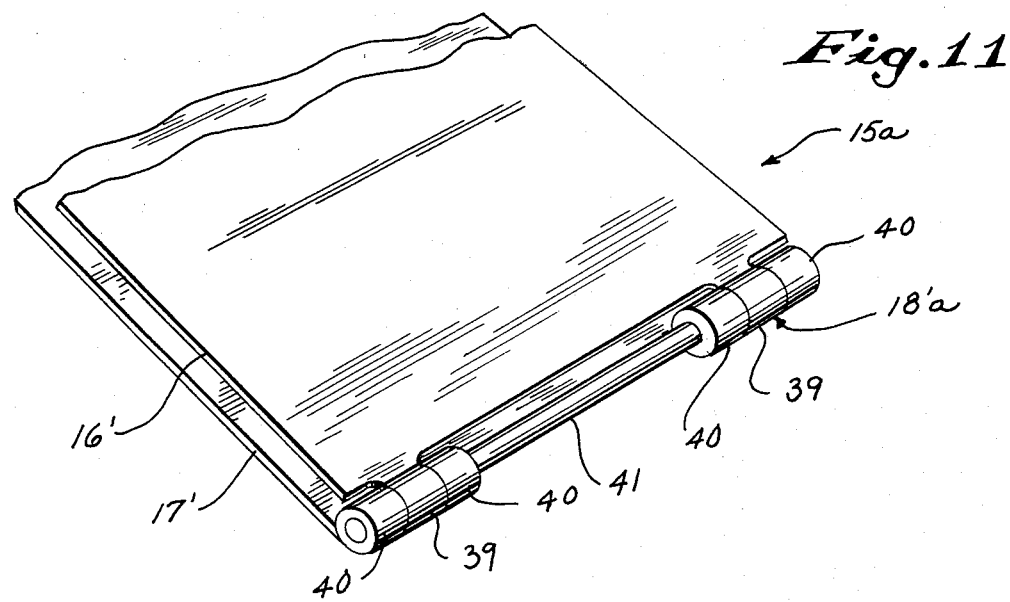
FIG. 11 is a back view of another binder similar to that of FIG. 6 but in which the hinge consists of aligned loops and a hinge pin.
Figure 12:
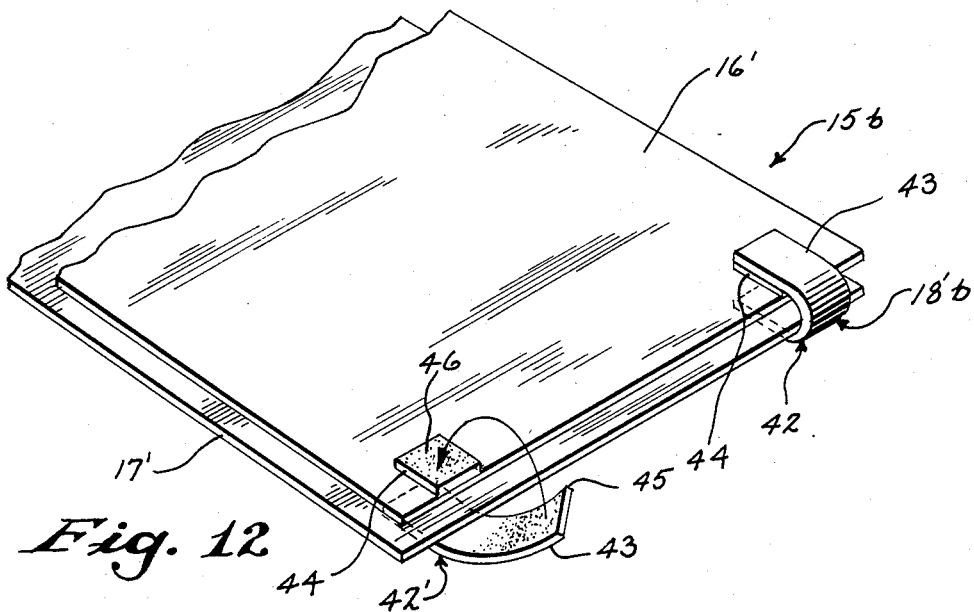
FIG. 12 is a view similar to FIG. 11 of a binder having still another type of hinge.

In FIGS. 11 and 12 other forms of binders of the present invention are shown. In the binder 15'a of FIG. 11, the hinge 18'a consists of the aligned loops 39 and 40 on the top cover 16' and bottom cover 17', respectively, which are secured by a removable hinge pin 41. In the binder 15'b of FIG. 12 the hinge 18'b consists of at least one and preferably a pair of hook and loop fasteners 42,42'. The fasteners 42,42' each consist of a strap 43 which is secured at one end to the bottom plate 17' and an attachment site 44 on the top plate 16'. The free ends of the straps 43 and the attachment sites 44 are provided with either loop members 45 or complementary hook members 46 of a fastener of the Velcro type.

It will be appreciated by those skilled in the art that the hinge may also take other forms; therefore, the word "hinge" as used herein and in the claims is intended to cover any structure which functions as a hinge and permits the pack of transparencies to be raised and lowered to rotate transparencies into position for projection and back into storage.

Figure 13:
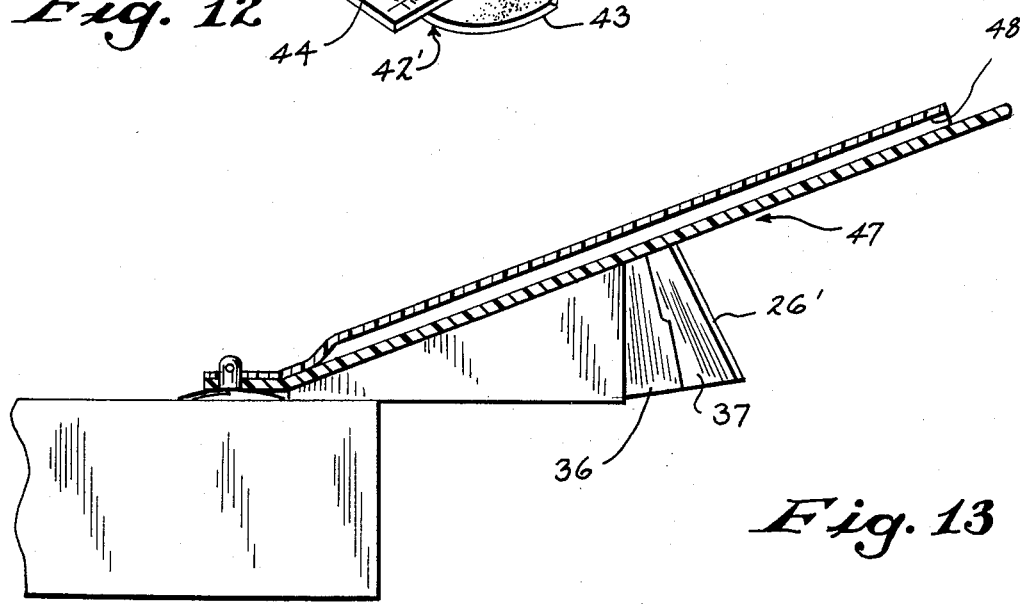
FIG. 13 is a prospective view of a separate extension platform with a fulcrum similar to that seen in FIGS. 8 and 9.

In FIG. 13 an extension platform 47 is shown which is provided with the previously described fulcrum 26' which is formed of the interlocked flaps 36 and 37. The extension platform 47 also includes a pocket 48 for removably receiving a bottom cover of a book of tranparencies.

As can be seen in FIGS. 3, 4, 5, 6 and 7, when either embodiment of the present invention is properly oriented on the projector and a pack of transparencies is in place, the continuous binding 14 which is attached to the upper cover 16, 16' or the page 34, will extend past the edge of the extension platform 13 or the base 20'. This permits the transparencies to be moved into a projecting position in which they lay flat upon the stage of the projector. Thus, any possibility of distortion which might occur due to the failure of the transparency to lay flat upon the stage is avoided.

All of the embodiments of the invention are preferably used in substantially the same manner. Therefore, the use of the extension platform will be described in detail only in connection with the embodiment of FIGS. 2 to 4.

The extension platform 13 is first secured to the stage 10a of the overhead projector 10 by pressing the suction cups 22 securely in place on a flat uninterrupted surface of the stage 10a. The positions of the suction cups 22 on the stage 10a are selected, preferably with the help of alignment markings, so that when a transparency 12 is moved onto the stage it will be properly aligned for projection and the fulcrum 26 will also rest upon the stage 10a. To improve the stability of the extension platform 13 on the overhead projector 10 the bottom of the fulcrum 26 may be provided with a pad 38 of a suitable slip resistant material as seen in FIGS. 3, 4 and 5.

When the extension platform 13 is secured, as described, to the stage 10a of the projector 10, and a pack 11 of transparencies 12 is in place, a transparency 12 may be moved into a projecting position upon the stage 10a as seen in FIG. 1. When it is desired to replace that transparency 12 with another, the pack 11 of the transparencies 12 is raised as shown in FIG. 4 or 5 and the transparency 12 which was projected is rotated into storage. When the pack 11 is lowered a new transparency 12 can be rotated into a projecting position on the stage 10a. Because of the hinge 18, the described acts can be performed quickly without removing the pack 11 from the extension platform 13 or the extension platform 13 from the overhead projector 10. In addition, these acts can be accomplished without using the auxiliary stages that were previously considered necessary.

It will be readily apparent to those skilled in the art that the extension platform of the present invention provides significant advantages over those which were previously available. It also will be apparent that a number of modifications and changes can be made without departing from the spirit and scope of the present invention. Therefore, it is to be understood that the invention is not to be limited except by the claims which follow

I claim:

1. An extension platform for holding a pack of transparencies in an operative position on an overhead projector, said platform including an elongated body member for supporting a pack of transparencies, at least two suction cups on the underside of the body member at one end thereof for attaching it directly to the stage of an overhead projector, fulcrum means located beneath the body member adjacent the one end thereof, said fulcrum being positioned to contact the stage and to translate the downward gravitational force of the weight of the pack of transparencies into a substantially vertical upward pull on the suction cups, and means for securing the pack of transparencies to the body member, said means being an upward projection at the other end of the body member, which projection cooperates with the pack to prevent it from being separated from the extension platform, said pack is in a book and the upward projection and the hinge of the book have aligned openings into which a plug can be inserted to lock the book to the body member and the fulcrum means is a generally wedge-shaped member attached to the underside of the body member.

2. An extension platform for holding a pack of transparencies in an operative position on an overhead projector, said platform including an elongated body member for supporting a pack of transparencies, at least two suction cups on the underside of the body member at one end thereof for attaching it directly to the stage of an overhead projector, and fulcrum means located beneath the body member adjacent the one end thereof, said fulcrum being positioned to contact the stage and to translate the downward gravitational force of the weight of the pack of transparencies into a substantially vertical upward pull on the suction cups, the means for securing the pack of transparencies to the body member is an upward projection at the other end of the body member, which projection cooperates with the pack to prevent it from being separated from the extension platform, said pack is in a book and the upward projection and the hinge of the book have aligned openings into which a plug can be inserted to lock the book to the body member, and the fulcrum means is comprised of normally lay-flat members that are interlocked to form a generally wedge-shaped fulcrum.

3. An extension platform for holding a pack of transparencies in an operative position on an overhead projector, said platform including an elongated body member for supporting a pack of transparencies, at least two suction cups on the underside of the body member at one end thereof for attaching it directly to the stage of an overhead projector, and fulcrum means located beneath the body member adjacent the one end thereof, said fulcrum being positioned to contact the stage and to translate the downward gravitational force of the weight of the pack of transparencies into a substantially vertical upward pull on the suction cups, the means for securing the pack of transparencies to the body member is an upward projection at the other end of the body member, which projection cooperates with the pack to prevent it from being separated from the extension platform, said pack is in a book and the upward projection and the hinge of the book have aligned openings into which a plug can be inserted to lock the book to the body member, and the fulcrum means is attached to the cover of a book of transparencies.

4. A binder for a pack of transparencies including a bottom panel having a relatively small base hingedly attached thereto at one end, said base being provided with a pair of suction cups for attachment to the stage of an overhead projector; the other end of said bottom panel being hingedly connected to a binder back panel by a second hinge, a top panel connected to the binder back panel by a third hinge, said top panel being longer than said bottom panel and having a ring binding at the free end thereof binding at least one transparency to said binder; said binder further including as part of the bottom panel a fulcrum for supporting said binder when it is attached to the stage agea of a projector with the suction cups at an angle which translates the weight of the binder and the transparency into a substantially vertical upward pull on the suction cups.

5. A binder for a pack of transparencies including a bottom panel having a relatively small base hingedly attached thereto at one end, said base being provided with a pair of suction cups for attachment to the stage of an overhead projector; a top panel which is longer than said bottom panel and which has a ring binding at one end thereof binding at least one transparency to said top panel and a hinge connecting the other ends of the bottom panel and the top panel to form a binder, said binder further including as part of the bottom panel a fulcrum for supporting said binder when it is attached to the stage area of a projector with the suction cups at an angle which translates the weight of the binder and the transparency into a substantially vertical upward pull on the suction cups.

6. The binder of claim 5 in which the fulcrum is comprised of normally lay-flat members that are interlocked to form a generally wedge-shaped fulcrum.

7. The binder of claim 5 in which the hinge consists of aligned loops on the other ends of the bottom panel and the top panel and a hinge pin which extends through said aligned loops.

8. The binder of claim 5 in which the hinge consists of male and female interlocking members mounted on the other ends of the top and bottom panels.

9. An extension platform for holding a pack of transparencies in an operative position on an overhead projector, said platform including an elongated body member for supporting a pack of transparencies, at least two suction cups on the underside of the body member at one end thereof for attaching it directly to the stage of an overhead projector and a fulcrum comprised of normally lay-flat members which are interlocked to form a generally wedge-shaped member located beneath the body member at said the one end thereof, said fulcrum means being positioned to contact the stage and to translate the downward gravitational force of the weight of the pack of transparencies into a substantially vertical upward pull on the suction cups.

* * * * *